United States Patent
Hsu

(10) Patent No.: US 10,896,314 B2
(45) Date of Patent: Jan. 19, 2021

(54) FINGERPRINT IDENTIFICATION MODULE

(71) Applicant: PRIMAX ELECTRONICS LTD., Taipei (TW)

(72) Inventor: Mao-Hsiu Hsu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/448,033

(22) Filed: Jun. 21, 2019

(65) Prior Publication Data
US 2020/0334444 A1   Oct. 22, 2020

(30) Foreign Application Priority Data
Apr. 19, 2019   (TW) .............................. 108113845 A

(51) Int. Cl.
*G06K 9/00* (2006.01)
*G06K 9/58* (2006.01)

(52) U.S. Cl.
CPC ....... *G06K 9/00087* (2013.01); *G06K 9/0004* (2013.01); *G06K 9/58* (2013.01)

(58) Field of Classification Search
CPC ............. G06K 9/0004; G06K 9/00046; G06K 9/00053; G06K 9/58; G06K 9/0087; G02B 27/0955
See application file for complete search history.

(56) References Cited

U.S. PATENT DOCUMENTS

| | | | |
|---|---|---|---|
| 2018/0336389 A1* | 11/2018 | Wu ............................ | G01J 1/44 |
| 2019/0180072 A1* | 6/2019 | Fomani ............... | G06K 9/00046 |
| 2019/0197290 A1* | 6/2019 | Chen ..................... | G06K 9/0004 |
| 2019/0214420 A1* | 7/2019 | Kim ..................... | H01L 27/1463 |
| 2020/0026898 A1* | 1/2020 | Fan ....................... | H04N 5/2254 |
| 2020/0200596 A1* | 6/2020 | Shepelev .............. | G09G 3/3413 |

* cited by examiner

*Primary Examiner* — Lixi C Simpson
(74) *Attorney, Agent, or Firm* — WPAT, PC

(57) ABSTRACT

A fingerprint identification module includes a contact layer, at least one light source, at least one image sensor and a lens. The at least one light source emits at least one light beam. The contact layer is exposed outside the fingerprint identification module to be contacted with a user's finger. The at least one image sensor is located under the contact area. After the at least light beam is received by the at least one image sensor, a corresponding fingerprint image is generated. The lens is arranged between the contact layer and the at least one image sensor, and includes plural openings. The lens includes plural openings. After the at least one light beam is reflected by the finger, the at least one light beam is transmitted through the plural openings and projected to the at least one image sensor.

5 Claims, 5 Drawing Sheets

FINGERPRINT IDENTIFICATION MODULE

FIELD OF THE INVENTION

The present invention relates to an identity identification element, and more particularly to a fingerprint identification module for identifying the identity of a user through a fingerprint.

BACKGROUND OF THE INVENTION

Recently, identity identification elements have been widely applied to a variety of electronic products. For example, the identity identification element includes a fingerprint identification module, a human face identification module, or the like. The fingerprint identification module is operated by using a fingerprint identification technology or a camera. The human face identification module is operated by using a human face identification technology.

Take the fingerprint identification module for example. By using the fingerprint identification technology, the user's fingerprint can be inputted into an electronic product and saved in the electronic product. For unlocking the electronic product, the user has to input the fingerprint through the fingerprint identification module. The way of unlocking the electronic product by the fingerprint identification technology is faster and more user-friendly than the way of manually inputting the password. Consequently, the fingerprint identification technology is favored by many users, and the demands on the fingerprint identification module are gradually increased.

Nowadays, the widely-used fingerprint identification technologies include a capacitive fingerprint identification technology, an optical fingerprint identification technology, an ultrasonic fingerprint identification technology, and so on. When compared with the capacitive fingerprint identification technology, the optical fingerprint identification technology does not need to cut the touch panel (also referred as a screen). Consequently, the optical fingerprint identification technology is gradually favored and widely used. For example, an on-screen fingerprint identification technology is one of the optical fingerprint identification technologies. According to the on-screen fingerprint identification technology, a fingerprint identification module is located under an organic light-emitting diode screen, which is referred hereinafter as an OLED screen. Since the fingerprint identification module is not exposed outside the electronic device, the on-screen fingerprint identification technology is gradually popular.

The fingerprint identification module for the on-screen fingerprint identification technology comprises an image sensor and a microprocessor. The image sensor is a charge coupled device (CCD) or a contact image sensor (CIS). The OLED screen emits a light beam. When the user's finger is placed on the OLED screen, the light beam is projected to the user's finger on the OLED screen. The light beam is reflected by the user's finger and received by the image sensor. When the light beam is sensed by the image sensor, a fingerprint image corresponding to the user's finger is generated. The microprocessor performs a fingerprint identification algorithm to recognize the fingerprint image. If the fingerprint image passes the test of the fingerprint identification process, an unlocking task or an authenticating task is successfully done.

With the increasing development of science and technology, the demands on the operating accuracy of the fingerprint identification module are gradually increased. Therefore, there is a need of providing a fingerprint identification module with enhanced operating accuracy.

SUMMARY OF THE INVENTION

The present invention provides a fingerprint identification module with enhanced operating accuracy.

In accordance with an aspect of the present invention, a fingerprint identification module is provided. The fingerprint identification module includes a contact layer, at least one light source, at least one image sensor and a lens. The contact layer is exposed outside the fingerprint identification module to be contacted with a finger. The at least one light source emits at least one light beam. The at least one light beam is projected to the contact layer. The at least one image sensor is located under the contact area. After the at least light beam is received by the at least one image sensor, a corresponding fingerprint image is generated. The lens is arranged between the contact layer and the at least one image sensor, and includes plural openings. After the at least one light beam is reflected by the finger, the at least one light beam is transmitted through the plural openings and projected to the at least one image sensor. A diameter of at least one of the plural openings is in a range between 7.2 micrometer and 12 micrometer.

In accordance with another aspect of the present invention, a fingerprint identification module is provided. The fingerprint identification module includes a contact layer, at least one light source, at least one image sensor and a lens. The contact layer is exposed outside the fingerprint identification module to be contacted with a finger. The at least one light source emits at least one light beam. The at least one light beam is projected to the contact layer. The at least one image sensor is located under the contact area. After the at least light beam is received by the at least one image sensor, a corresponding fingerprint image is generated. Each image sensor includes at least one sensitive area and at least one light-shading area. The at least one sensitive area receives the at least one light beam and generates the corresponding fingerprint image. The at least one light-shading area is arranged around the at least one sensitive area to shelter the at least one light beam. A length of each sensitive area is about 42.8 micrometer. A gap between every two adjacent sensitive areas is about 7.2 micrometer. A length of each light-shading area is about 50 micrometer. The lens is arranged between the contact layer and the at least one image sensor, and includes plural openings. After the at least one light beam is reflected by the finger, the at least one light beam is transmitted through the plural openings and projected to the at least one image sensor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
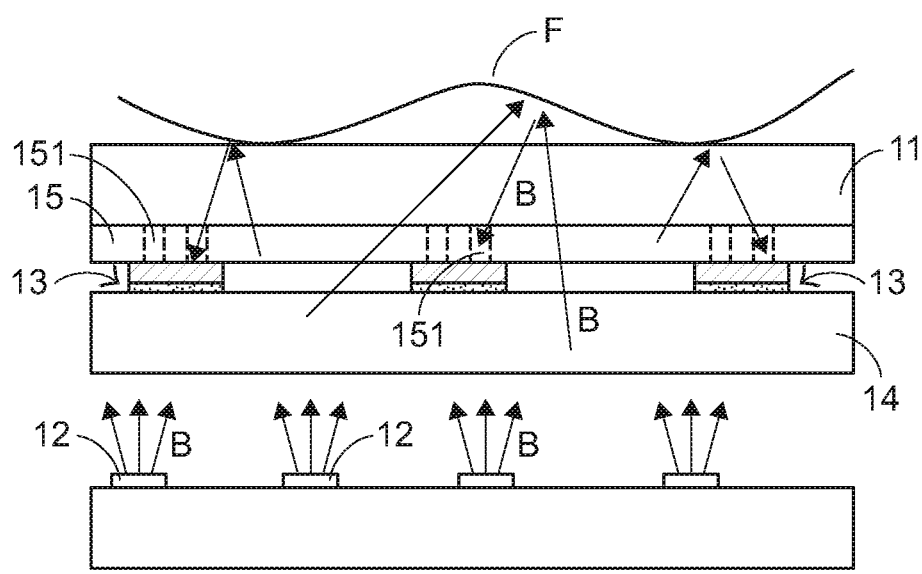
FIG. 1 is a schematic cross-sectional view illustrating the structure of a fingerprint identification module according to an embodiment of the present invention.

For solving the drawbacks of the conventional technologies, the present invention provides a fingerprint identification module. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

FIG. 1 is a schematic cross-sectional view illustrating the structure of a fingerprint identification module according to an embodiment of the present invention. As shown in FIG. 1, the fingerprint identification module 1 comprises a contact layer 11, plural light sources 12, plural image sensors 13, a substrate 14 and a lens 15.

The contact layer 11 is exposed outside the fingerprint identification module 1. In addition, the contact layer 11 is contactable with a user's finger F. The plural light sources 12 are located under the substrate 14. The plural light sources 12 emit plural light beams B. The plural light beams B are projected to the contact layer 11. The plural image sensors 13 are located under the contact layer 11. When the plural light beams are sensed by the plural image sensor 13, a fingerprint image corresponding to the user's finger F is generated. The substrate 14 is located under the contact layer 11 and electrically connected with the plural image sensors 13. The plural image sensors 13 are supported by the substrate 14. Moreover, the substrate 14 is made of a light-transmissible material. Consequently, the plural light beams B are transmissible through the substrate 14. Preferably but not exclusively, the light sources 12 are ordinary light emitting diodes, micro light emitting diodes, organic light emitting diodes, or the like. The image sensors 13 are charge coupled devices (CCD) or contact image sensors (CIS).

Figure 2A:
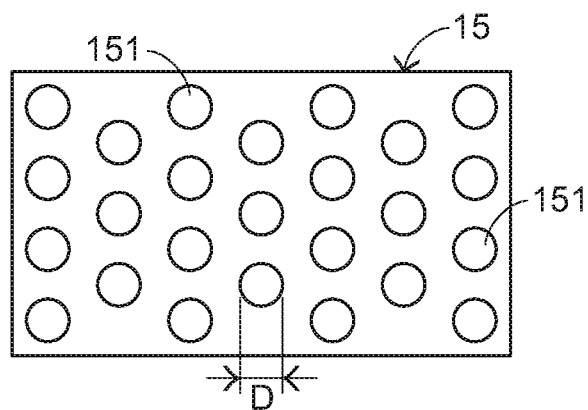
FIGS. 2A, 2B and 2C are schematic top views illustrating some examples of the lens used in the fingerprint identification module according to the embodiment of the present invention.
Figure 2B:
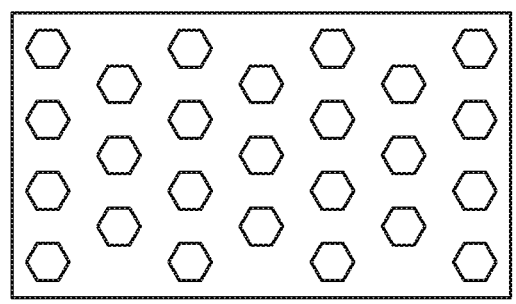
Figure 2C:
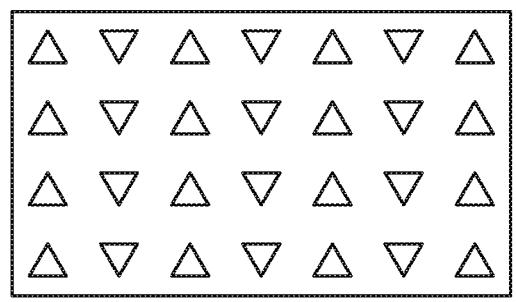

Please refer to FIG. 1 and FIGS. 2A, 2B and 2C. FIGS. 2A, 2B and 2C are schematic top views illustrating some examples of the lens used in the fingerprint identification module according to the embodiment of the present invention. The lens 15 is arranged between the contact layer 11 and the plural image sensors 13. The lens 15 has plural openings 151 for allowing the plural light beams B to go through. Consequently, the plural light beams B can be projected on the plural image sensors 13. According to the arrangement of the plural openings 151 and the pinhole imaging prince, the plural image sensors 13 generates the fingerprint image.

In the example of FIG. 2A, the plural openings 151 are circular openings. The diameter D of at least one of the plural openings 151 is in the range between 7.2 micrometer and 12 micrometer. It is noted that the shapes of the plural openings are not restricted. In the example of FIG. 2B, the plural openings are polygonal shapes (e.g., hexagonal openings). In the example of FIG. 2C, the plural openings are triangular openings.

Figure 3:
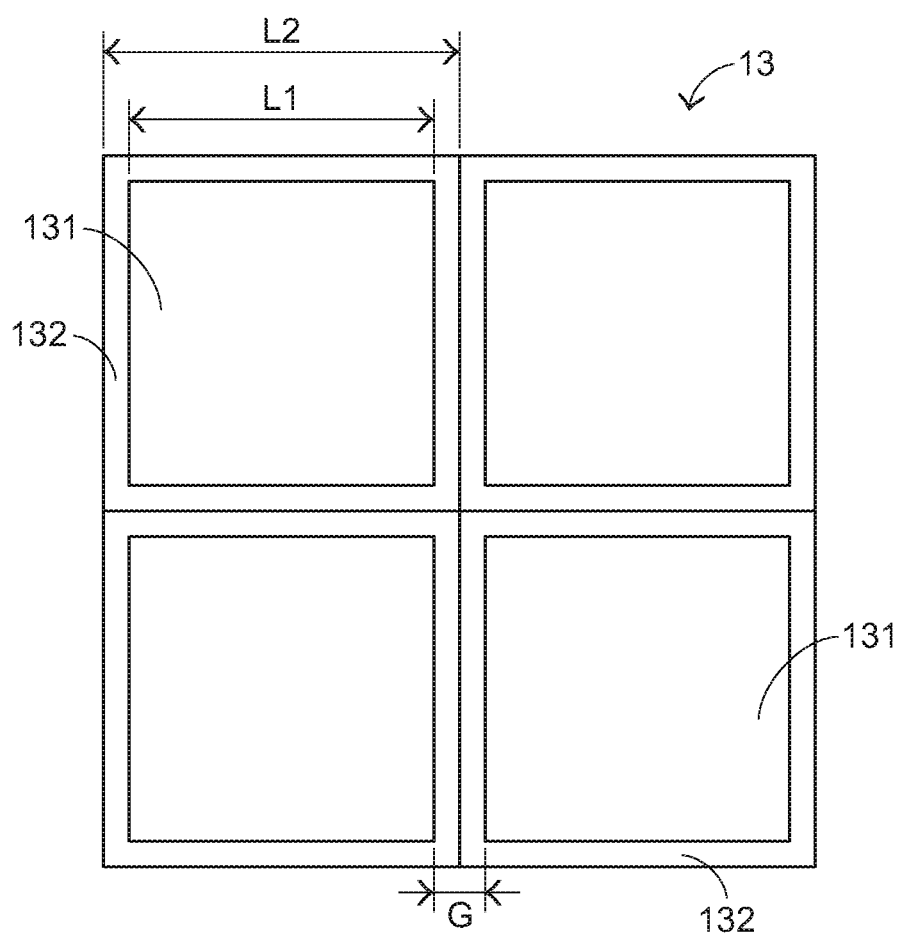
FIG. 3 is a schematic top view illustrating a portion of one image sensor used in the fingerprint identification module according to the embodiment of the present invention.

The structures of the image sensors 13 will be described in more details as follows. FIG. 3 is a schematic top view illustrating a portion of one image sensor used in the fingerprint identification module according to the embodiment of the present invention. Each image sensor 13 comprises plural sensitive areas 131 and plural light-shading areas 132. As shown in FIG. 3, the plural sensitive areas 131 and the plural light-shading areas 132 are arranged in 2×2 arrays. It is noted that the arrangements of the plural sensitive areas 131 and the plural light-shading areas 132 are not restricted. The sensitive areas 131 are used for receiving the plural light beams B and generating the corresponding fingerprint image. The plural light-shading areas 132 are located under the corresponding sensitive areas 131 and arranged around the corresponding sensitive areas 131. The plural light beams B are sheltered by the light-shading areas 132. In this embodiment, the sensitive area 131 and the light-shading area 132 have square shapes. The length L1 of each side of the sensitive area 131 is about 42.8 micrometer. The gap G between every two adjacent sensitive areas 131 is about 7.2 micrometer. The length L2 of each side of the light-shading area 132 is about 50 micrometer.

Figure 4:
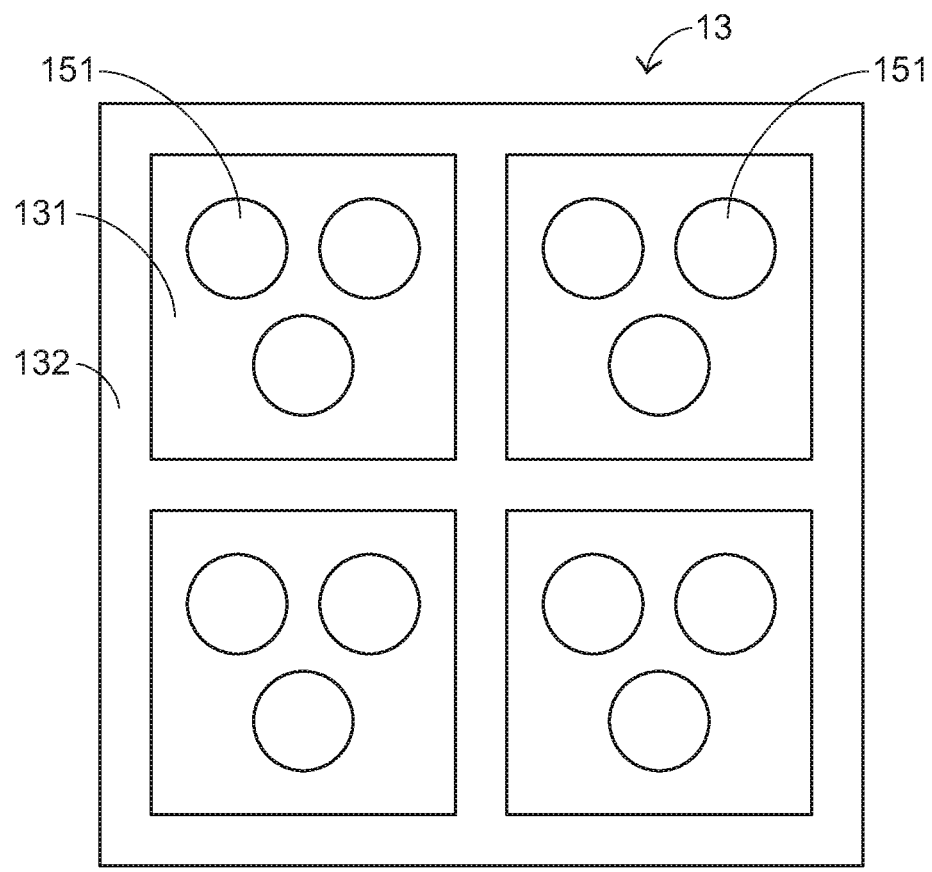
FIG. 4 is a schematic top view illustrating portions of the lens and one image sensor used in the fingerprint identification module according to the embodiment of the present invention.

FIG. 4 is a schematic top view illustrating portions of the lens and one image sensor used in the fingerprint identification module according to the embodiment of the present invention. In FIG. 4, a portion of the lens 15 and one image sensor 13 are shown. That is, only a portion of the fingerprint identification module is shown in FIG. 4. In this embodiment, the plural openings 151 are regularly formed in the lens 15. Especially, N openings are aligned with one image sensor 13. In this embodiment, N is 12. It is noted that the value of N is not restricted. Since the plural openings 151 are regularly formed in the lens 15, the arrangement of the plural openings 151 may be adjusted according to the corresponding image sensor 13. Consequently, the light-transmitting efficacy is enhanced and the fingerprint image is optimized. In such way, the identifying accuracy of the fingerprint identification module 1 is increased.

Figure 5:
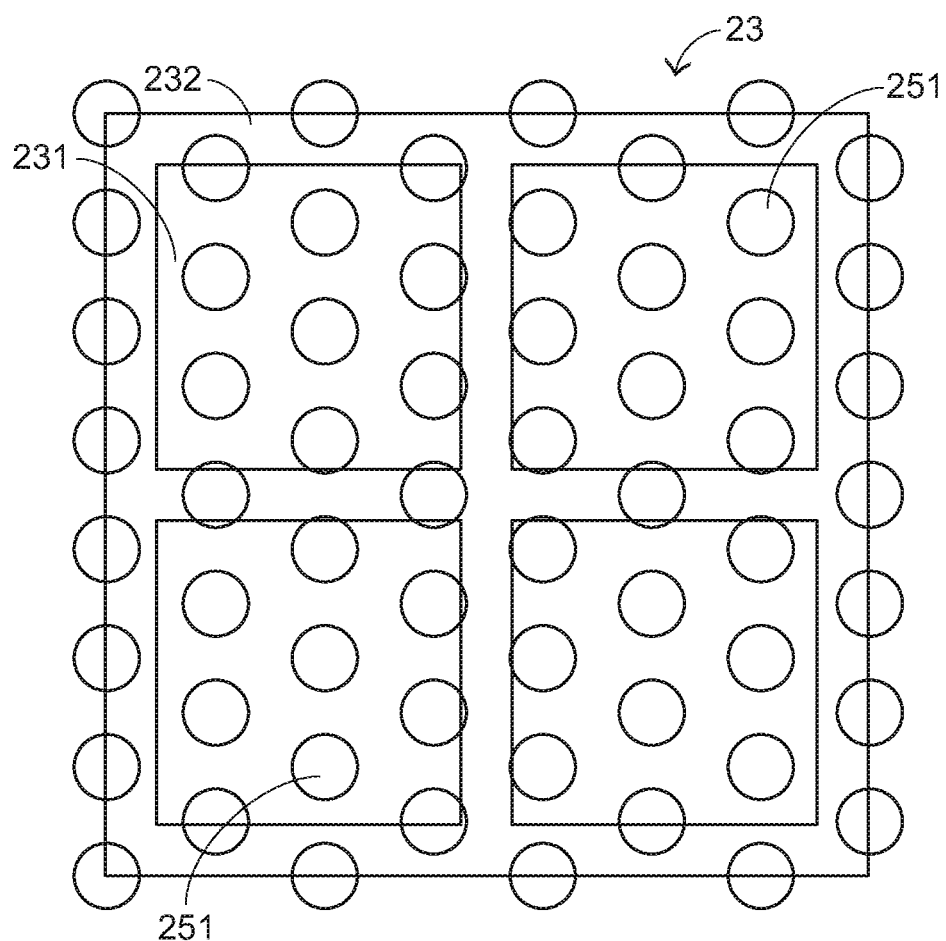
FIG. 5 is a schematic top view illustrating portions of the lens and one image sensor used in the fingerprint identification module according to another embodiment of the present invention.

Moreover, the structure of the lens may be modified. FIG. 5 is a schematic top view illustrating portions of the lens and one image sensor used in the fingerprint identification module according to another embodiment of the present invention. In FIG. 5, a portion of the lens 25 and one image sensor 23 are shown. The lens 25 comprises plural openings 251. Each image sensor 23 comprises plural sensitive areas 231 and plural light-shading areas 232.

As shown in FIG. 5, the plural openings 251 are uniformly distributed in the lens 25. That is, the plural openings 251 are irregularly located over the plural image sensors. The design of the lens 25 has the following benefits. Firstly, it is not necessary to align the plural openings 251 with the image sensors 23. Consequently, the assembling difficulty is reduced. Secondly, the diameters of the openings 251 may be decreased. Since the incidence angles of the light beams B entering the openings 251 are decreased, the identifying accuracy of the fingerprint identification module 1 is increased. Thirdly, since the plural openings 251 are uniformly distributed in the lens 25, the light-sensing capabilities of the image sensors 23 will be more uniform.

From the above descriptions, the lens of the fingerprint identification module is specially designed. Consequently, the light-transmitting efficacy is enhanced, and the identifying accuracy of the fingerprint identification module is increased. In other words, the fingerprint identification module is capable of overcoming the drawbacks of the conventional technologies.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint identification module, comprising:
   a contact layer exposed outside the fingerprint identification module to be contacted with a finger;
   at least one light source emitting at least one light beam, wherein the at least one light beam is projected to the contact layer;
   at least one image sensor located under the contact area, wherein after the at least light beam is received by the at least one image sensor, a corresponding fingerprint image is generated, wherein each image sensor comprises at least one sensitive area and at least one light-shading area, wherein the at least one sensitive area receives the at least one light beam and generates the corresponding fingerprint image, the at least one light-shading area is arranged around the at least one sensitive area to shelter the at least one light beam, a length of each sensitive area is about 42.8 micrometer, a gap between every two adjacent sensitive areas is about 7.2 micrometer, and a length of each light-shading area is about 50 micrometer; and
   a lens arranged between the contact layer and the at least one image sensor, and comprising plural openings, wherein after the at least one light beam is reflected by the finger, the at least one light beam is transmitted through the plural openings and projected to the at least one image sensor.

2. The fingerprint identification module according to claim 1, wherein a diameter of at least one of the plural openings is in a range between 7.2 micrometer and 12 micrometer.

3. The fingerprint identification module according to claim 1, wherein the fingerprint identification module further comprises a substrate, wherein the substrate is located under the contact layer and electrically connected with the at least one image sensor, wherein the substrate is made of a light-transmissible material, so that the at least one light beam is transmissible through the substrate.

4. The fingerprint identification module according to claim 1, wherein the plural openings are regularly formed in the lens, wherein N openings of the plural openings are aligned with each image sensor, and the N openings are located over the corresponding image sensor.

5. The fingerprint identification module according to claim 1, wherein plural openings are uniformly distributed in the lens, and the plural openings are irregularly located over the at least one image sensor.

* * * * *